US012364933B2

United States Patent
Takeuchi et al.

(10) Patent No.: US 12,364,933 B2
(45) Date of Patent: Jul. 22, 2025

(54) SYSTEM FOR PRODUCING MAGNESIUM HYDROXIDE

(71) Applicant: MITSUBISHI HEAVY INDUSTRIES, LTD., Tokyo (JP)

(72) Inventors: Kazuhisa Takeuchi, Tokyo (JP); Yoshiaki Ito, Tokyo (JP); Ryo Kamito, Tokyo (JP); Shinpei Kaneda, Yokohama (JP); Masashi Kiyosawa, Yokohama (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 608 days.

(21) Appl. No.: 17/790,778

(22) PCT Filed: Dec. 16, 2020

(86) PCT No.: PCT/JP2020/046969
§ 371 (c)(1),
(2) Date: Jul. 5, 2022

(87) PCT Pub. No.: WO2021/140856
PCT Pub. Date: Jul. 15, 2021

(65) Prior Publication Data
US 2023/0038572 A1 Feb. 9, 2023

(30) Foreign Application Priority Data

Jan. 8, 2020 (JP) .................................. 2020-001482

(51) Int. Cl.
*B01J 19/00* (2006.01)
*B01D 9/00* (2006.01)
(Continued)

(52) U.S. Cl.
CPC ........... *B01D 9/005* (2013.01); *B01D 9/0063* (2013.01); *B01J 14/00* (2013.01); *B01J 19/0006* (2013.01);
(Continued)

(58) Field of Classification Search
CPC .................. B01D 9/005; B01D 9/0063; B01D 2009/0086; B01D 9/0054; B01D 9/0059;
(Continued)

(56) References Cited

U.S. PATENT DOCUMENTS

2012/0189850 A1    7/2012 Ohsaki

FOREIGN PATENT DOCUMENTS

JP    H04-164809 A    6/1992
JP    2004-345912 A   12/2004
(Continued)

OTHER PUBLICATIONS

Journal of the Ceramic Society, 1952, vol. 6, No. 676, pp. 429-435, cited in JP Office Action dated Oct. 10, 2023. (7 pages).
(Continued)

*Primary Examiner* — Huy Tram Nguyen
(74) *Attorney, Agent, or Firm* — WHDA, LLP

(57) ABSTRACT

Disclosed is a system for producing magnesium hydroxide including: a generation unit; and a recovery unit connected to the generation unit, wherein the generation unit has a reaction tank in which a calcium hydroxide slurry is added to water to be treated containing magnesium ions to crystallize magnesium hydroxide and to obtain a reaction slurry containing particles of magnesium hydroxide, and a sedimentation tank in which the reaction slurry is reserved to sediment the particles and to separate the reaction slurry into a separation slurry containing the particles at a high concentration and a separation liquid containing the particles at a low concentration, and wherein, in the recovery unit, an
(Continued)

alkaline aqueous solution is added to the separation liquid to crystallize magnesium hydroxide and to obtain the reaction slurry and then the reaction slurry is reserved to sediment the particles and to recover the sedimented particles.

11 Claims, 2 Drawing Sheets

(51) Int. Cl.
　　*B01J 14/00*　　(2006.01)
　　*B01J 19/06*　　(2006.01)
　　*B01J 19/24*　　(2006.01)
　　*C01F 5/22*　　(2006.01)
　　*C02F 1/52*　　(2023.01)
　　*C02F 103/08*　　(2006.01)

(52) U.S. Cl.
　　CPC .............. *B01J 19/06* (2013.01); *B01J 19/245* (2013.01); *C01F 5/22* (2013.01); *C02F 1/5209* (2013.01); *C02F 1/5236* (2013.01); *B01D 2009/0086* (2013.01); *B01J 2219/00186* (2013.01); *C02F 2001/5218* (2013.01); *C02F 2103/08* (2013.01)

(58) Field of Classification Search
　　CPC ....... B01D 19/00; B01J 14/00; B01J 19/0006; B01J 19/06; B01J 19/245; B01J 2219/00186; C01F 5/22; C02F 1/5209; C02F 1/5236; C02F 2001/5218; C02F 2103/08; C02F 1/441; C02F 1/5281; C02F 1/20; Y02P 10/20

USPC ........................................................ 422/108
　　See application file for complete search history.

(56) References Cited

FOREIGN PATENT DOCUMENTS

| JP | 2011-073951 A | | 4/2011 | |
| KR | 2731231 B1 | * | 11/2024 | .......... B01J 19/0066 |
| WO | WO-2019044197 A1 | * | 3/2019 | ............ B01D 21/00 |

OTHER PUBLICATIONS

Suzuki, K. and Furihata, S., "Utilization of Sea Water (Part 5) on the growthing of the crystal of magnesium hydroxide", Journal of Japanese Salt Society, 1951, vol. 5, No. 1, pp. 26-37, cited in JP Office Action dated Oct. 10, 2023. (pages).
Office Action dated Oct. 10, 2023, issued in counterpart JP application No. 2020-001482, with English translation. (10 pages).
Tsuge, Hideki, "Reactive Crystallization of Magnesium Hydroxide", Bulletin of the Society of Sea Water Science, Japan, vol. 51, No. 6, 1997; w/Partial English Translation. (13 pages).
International Search Report dated Feb. 22, 2021, issued in counterpart Application No. PCT/JP2020/046969, with English Translation. (4 pages).
Written Opinion dated Feb. 22, 2021, issued in counterpart Application No. PCT/JP2020/046969, with English Translation. (6 pages).

* cited by examiner

SYSTEM FOR PRODUCING MAGNESIUM HYDROXIDE

TECHNICAL FIELD

The present disclosure relates to a system for producing magnesium hydroxide.

Priority is claimed on Japanese Patent Application No. 2020-001482, filed Jan. 8, 2020, the content of which is incorporated herein by reference.

BACKGROUND ART

In the related art, as a method for obtaining magnesium dissolved in seawater, a method of adding a calcium hydroxide ($Ca(OH)_2$) slurry to seawater to crystallize magnesium hydroxide ($Mg(OH)_2$) is known (see Non Patent Literature 1, for example).

In the above reaction, magnesium ions ($Mg^{2+}$) contained in seawater react with hydroxide ions ($OH^-$) derived from $Ca(OH)_2$ to generate $Mg(OH)_2$. Since $Mg(OH)_2$ has a low solubility in water of 9.8 mg/100 $cm^3$ (@ 18° C.), a reaction solution from which $Mg(OH)_2$ is generated is a slurry in which $Mg(OH)_2$ is dispersed. In the following description, a slurry in which $Mg(OH)_2$ is generated by causing crystallization from a solution in which the magnesium ions are dissolved may be referred to as a "reaction slurry."

In the reaction slurry, the sedimentation of $Mg(OH)_2$ causes a difference in the concentration of $Mg(OH)_2$ in a depth direction. Therefore, the reaction slurry is reserved in a tank in which $Mg(OH)_2$ is sedimented, and the reaction slurry is separated into an upper layer having a relatively low content of $Mg(OH)_2$ and a lower layer having a relatively high content of $Mg(OH)_2$, and thus $Mg(OH)_2$ can be recovered. In the following description, the tank in which $Mg(OH)_2$ is sedimented may be referred to as a "sedimentation tank."

CITATION LIST

Non Patent Literature

Non Patent Literature 1
Bulletin of the Society of Sea Water Science, Japan, Vol. 51. No. 6 (1997)

SUMMARY OF INVENTION

Technical Problem

It is known that, in the above reaction, when $OH^-$ having an amount exceeding the amount of $Mg^{2+}$ contained in seawater is reacted with the $Mg^{2+}$, the sedimentation rate of $Mg(OH)_2$ in the reaction slurry decreases as compared with the sedimentation rate of $Mg(OH)_2$ generated in the reaction between $Mg^{2+}$ and $OH^-$ having an amount equal to the amount of $Mg^{2+}$. When the sedimentation rate of $Mg(OH)_2$ decreases, a waiting time for waiting for the sedimentation of $Mg(OH)_2$ is required, and the production efficiency decreases. In this case, in order to secure the production amount of $Mg(OH)_2$ per unit time of a certain amount or more, it is necessary to increase the bottom area of the sedimentation tank and increase the installation area of the equipment. Therefore, the addition amount of $OH^-$ is required to be controlled as accurately as possible.

Also in the following description, in a case where the sedimentation rate of $Mg(OH)_2$ is discussed, with the sedimentation rate of $Mg(OH)_2$ generated in the reaction between $Mg^{2+}$ and $OH^-$ having an amount equal to the amount of $Mg^{2+}$ as a reference, when the sedimentation rate is slower than the reference, this is expressed as "the sedimentation rate decreases."

On the other hand, in the above reaction. $Ca(OH)_2$, which is excellent in cost competitiveness, is usually used as a $OH^-$ source. However, since $Ca(OH)_2$ has a poor solubility in water of 0.16 g/100 $cm^3$ (@ 20° C.), $Ca(OH)_2$ is generally added in a slurry state. Therefore, in the method using $Ca(OH)_2$ of the related art, it is difficult to accurately control the addition amount of $OH^-$.

It has been described above that a target for recovering magnesium is seawater, but the same problem arises even in a case where magnesium is recovered from another aqueous solution in which magnesium is dissolved.

The present disclosure has been made in view of such circumstances, and an object of the present disclosure is to provide a system for producing magnesium hydroxide capable of easily controlling the addition amount of hydroxide ions and improving the production efficiency.

Solution to Problem

In order to solve the above problems, a system for producing magnesium hydroxide according to the present disclosure includes: a generation unit; and a recovery unit connected to the generation unit, wherein the generation unit has a reaction tank in which a calcium hydroxide slurry is added to water to be treated containing magnesium ions to crystallize magnesium hydroxide and to obtain a reaction slurry containing particles of magnesium hydroxide, and a sedimentation tank in which the reaction slurry is reserved to sediment the particles and to separate the reaction slurry into a separation slurry containing the particles at a high concentration and a separation liquid containing the particles at a low concentration, and wherein, in the recovery unit, an alkaline aqueous solution is added to the separation liquid to crystallize magnesium hydroxide and to obtain the reaction slurry and then the reaction slurry is reserved to sediment the particles and to recover the sedimented particles.

Advantageous Effects of Invention

According to the present disclosure, it is possible to provide a system for producing magnesium hydroxide capable of easily controlling the addition amount of hydroxide ions and improving the production efficiency.

DESCRIPTION OF EMBODIMENTS

First Embodiment

Hereinafter, a system for producing magnesium hydroxide according to a first embodiment of the present disclosure will be described with reference to FIG. 1. In all the drawings below, the dimensions and ratios of the constituent elements are appropriately different in order to make the drawings easier to see.

Figure 1:
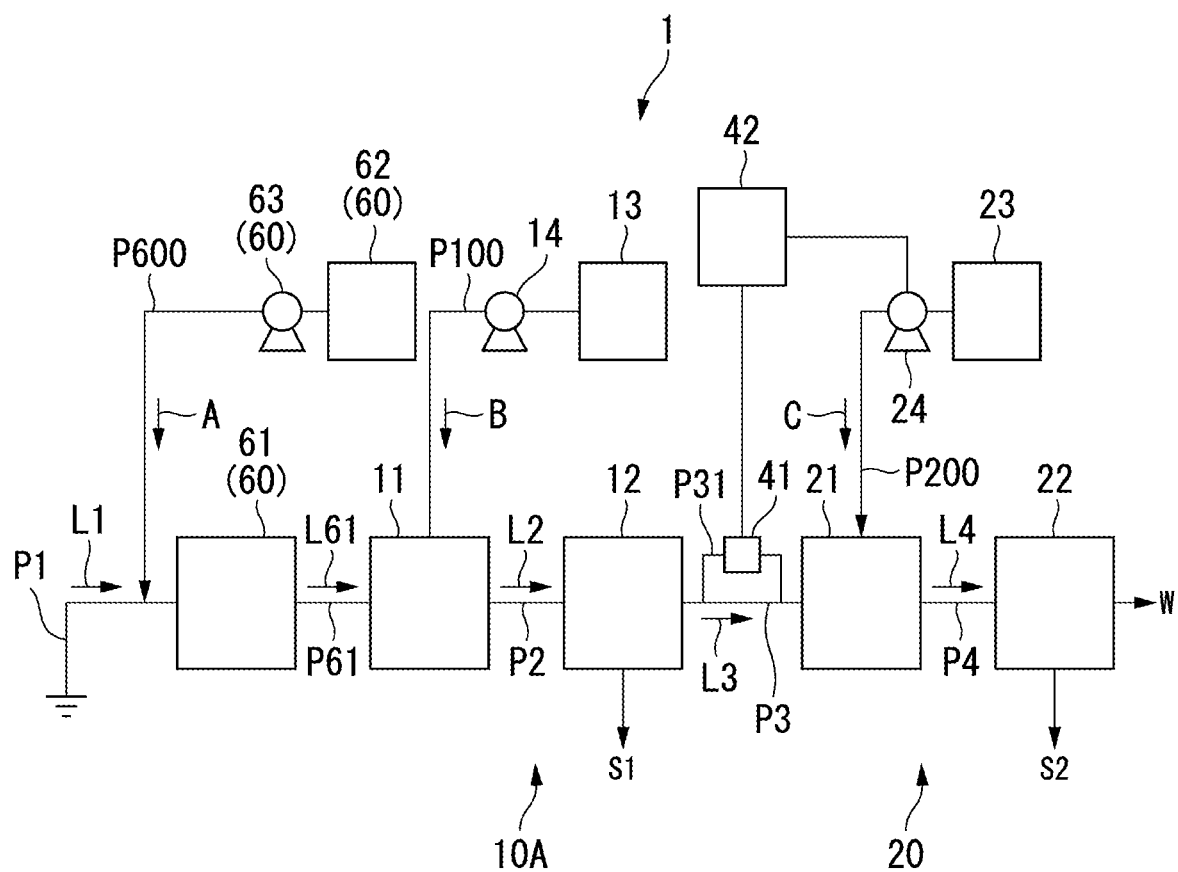
FIG. 1 is an explanatory diagram of a system for producing magnesium hydroxide according to a first embodiment of the present disclosure.

FIG. 1 is an explanatory diagram of the system for producing magnesium hydroxide according to the first embodiment of the present disclosure. The system for producing magnesium hydroxide 1 includes a generation unit 10, a recovery unit 20, a detection unit 41, a control unit 42, and a decarboxylation unit 60.

(Decarboxylation Unit)

The decarboxylation unit 60 is connected to the generation unit 10 on the upstream side of the generation unit 10. In the decarboxylation unit 60, at least some of carbonic acid dissolved in water to be treated L1 supplied to the generation unit 10 is removed.

The water to be treated is an aqueous solution containing magnesium ions. Examples of the water to be treated include seawater and industrial wastewater. Seawater also includes concentrated seawater obtained by removing water from seawater and concentrating it. The concentrated seawater corresponds to, for example, a concentrated liquid generated by treating seawater with a reverse osmosis membrane and separating the water from seawater.

Further, the water to be treated includes a liquid obtained by decarboxylating the water to be treated to reduce the carbonic acid.

A known configuration can be employed for the decarboxylation unit 60. The system for producing magnesium hydroxide 1 has a decarboxylation tower 61, a reservoir tank 62, and a supply device 63 as the decarboxylation unit 60.

In the decarboxylation tower 61, the carbonic acid contained in the water to be treated L1 is removed by aerating the water to be treated L1.

The reservoir tank 62 reserves acid A to be added to the water to be treated L1. As the acid A, for example, hydrochloric acid or sulfuric acid can be used.

The supply device 63 supplies the acid A from the reservoir tank 62 to the water to be treated L1 via a pipe P600. In FIG. 1, the pipe P600 is connected to a pipe P1. The water to be treated L1 is adjusted to be acidic with a pH of about 4 inside the pipe P1.

In the decarboxylation unit 60, the carbonic acid contained in the water to be treated L1 is removed by adding the acid A to the water to be treated L1 using the supply device 63 and then aerating the water to be treated L1. By decarboxylating the water to be treated L1, carbonate is less likely to be generated in a process, and it is possible to stably operate the system for producing magnesium hydroxide 1 for a long period of time.

The pipe P1 and a pipe P61 are connected to the decarboxylation unit 60. The water to be treated L1 is supplied to the decarboxylation unit 60 via the pipe P1. Further, the water to be treated decarboxylated in the decarboxylation unit 60 (water to be treated L61) is supplied to the generation unit 10 via the pipe P61.

(Generation Unit)

The generation unit 10 has a reaction tank 11 and a sedimentation tank 12. In the generation unit 10, a calcium hydroxide slurry is added to the water to be treated to crystallize $Mg(OH)_2$. Further, the generation unit 10 separates a slurry containing the particles of $Mg(OH)_2$ (the reaction slurry) into a separation slurry containing the particles of $Mg(OH)_2$ at a high concentration and a separation liquid containing the particles of $Mg(OH)_2$ at a low concentration.

(Reaction Tank)

The reaction tank 11 has a reservoir tank 13 and a supply device 14.

In the reaction tank 11, a calcium hydroxide slurry B is added to the water to be treated L61 to generate a reaction slurry L2 containing the particles of $Mg(OH)_2$.

The reservoir tank 13 reserves the calcium hydroxide slurry B to be added to the water to be treated L61.

The supply device 14 supplies the calcium hydroxide slurry B from the reservoir tank 13 to the water to be treated L61 via a pipe P100.

The amount of the calcium hydroxide slurry B supplied by the supply device 14 is set in advance according to the concentration of $Mg^{2+}$ contained in the water to be treated L1. For example, the concentration of $Mg^{2+}$ contained in the water to be treated L1 is separately measured, and the calcium hydroxide slurry B in which the amount of $OH^-$ is less than an equal amount to the amount of the measured $Mg^{2+}$ is supplied.

In a case where the fluctuation in the concentration of the magnesium ions contained in the water to be treated L1 is large, in the reaction tank 11, the concentration of the magnesium ions contained in the water to be treated L1 may be periodically or continuously measured, and the supply amount of the calcium hydroxide slurry B may be adjusted on the basis of the measurement result.

Further, in a case where the fluctuation in the concentration of the magnesium ions contained in the water to be treated L1 is little, in the reaction tank 11, the supply amount of the calcium hydroxide slurry B may be set with the concentration of the magnesium ions contained in the water to be treated L1 as a fixed value. In that case, for example, the minimum value assumed as the magnesium ion concentration may be set as the fixed value, and the calcium hydroxide slurry B in which the amount of $OH^-$ is less than the equal amount to the amount of the measured $Mg^{2+}$ of the fixed value may be supplied.

By controlling the supply amount of the calcium hydroxide slurry B in the reaction tank 11 as described above, it is possible to suppress a decrease in the sedimentation rate of the particles of $Mg(OH)_2$ contained in the generated reaction slurry L2.

(Sedimentation Tank)

The sedimentation tank 12 is connected to the reaction tank 11 via a pipe P2. The reaction slurry L2 generated in the reaction tank 11 is supplied to the sedimentation tank 12 via the pipe P2.

In the sedimentation tank 12, the reaction slurry L2 is reserved to sediment the particles of $Mg(OH)_2$. In the sedimentation tank 12, the reaction slurry L2 is separated into a separation slurry S1 containing the particles of $Mg(OH)_2$ at a high concentration and a separation liquid L3 containing the particles of $Mg(OH)_2$ at a low concentration.

The separation slurry S1 is extracted from the bottom of the sedimentation tank 12, for example. Separately, the separation slurry S1 is separated into the particles of $Mg(OH)_2$ and water. As a result. $Mg(OH)_2$, which is the target product, can be obtained.

(Recovery Unit)

The recovery unit 20 is connected to the sedimentation tank 12 via a pipe P3. The separation liquid L3 generated in the sedimentation tank 12 is supplied to the recovery unit 20 via the pipe P3.

The recovery unit 20 has a recovery reaction tank 21 and a recovery sedimentation tank 22. In the recovery unit 20, an alkaline aqueous solution is added to the separation liquid L3 to crystallize $Mg(OH)_2$ and to obtain a reaction slurry L4.

Further, in the recovery unit 20, the reaction slurry L4 is reserved to sediment the particles of $Mg(OH)_2$, to separate the reaction slurry L4 into a separation slurry S2 containing the particles of $Mg(OH)_2$ at a high concentration and a waste liquid W containing the particles of $Mg(OH)_2$ at a low concentration, and to recover the particles of $Mg(OH)_2$ contained in the separation slurry S2.

(Recovery Reaction Tank)

The recovery reaction tank 21 has a reservoir tank 23 and a supply device 24.

In the recovery reaction tank 21, an alkaline aqueous solution C is added to the separation liquid L3 to generate the reaction slurry L4 containing the particles of $Mg(OH)_2$.

In the reservoir tank 23, the alkaline aqueous solution C to be added to the separation liquid L3 is reserved. The concentration of the alkaline aqueous solution C is measured in advance.

As the alkaline aqueous solution C, an aqueous solution of an inorganic salt that becomes alkaline when dissolved in water can be used. For example, as the alkaline aqueous solution, at least one of a calcium hydroxide aqueous solution, a sodium hydroxide aqueous solution, and a potassium hydroxide aqueous solution can be used.

When a calcium hydroxide aqueous solution is used as the alkaline aqueous solution C, the chemical cost can be reduced.

On the other hand, industrially used calcium hydroxide is obtained by thermally decomposing limestone and hydrating the obtained calcium oxide. Therefore, the calcium hydroxide contains metal impurities derived from limestone as a raw material. On the other hand, for sodium hydroxide, it is easy to prepare a substance having less metal impurities (high purity) than the industrially used calcium hydroxide. Therefore, when the sodium hydroxide aqueous solution is used as the alkaline aqueous solution C, the particles of $Mg(OH)_2$ having high purity can be easily obtained as compared with a case where the calcium hydroxide aqueous solution is used as the alkaline aqueous solution C.

That is, when the sodium hydroxide aqueous solution is used as the alkaline aqueous solution C, the $Mg(OH)_2$ generated in the recovery reaction tank 21 can be made higher in purity than the $Mg(OH)_2$ generated in the reaction tank 11.

The solubility of the calcium hydroxide in water is 0.16 $g/100\ cm^3$ (@ 20° C.). On the other hand, the solubility of the sodium hydroxide in water is 111 $g/100\ cm^3$ (@20° C.). Therefore, the sodium hydroxide aqueous solution can be a solution having a relatively higher concentration than the calcium hydroxide aqueous solution.

As a result, when the sodium hydroxide aqueous solution is used as the alkaline aqueous solution C, the reservoir tank 23 and the supply device 24 can be relatively miniaturized and the burden of installation and maintenance of the equipment is reduced as compared with the case where the calcium hydroxide aqueous solution is used as the alkaline aqueous solution C.

The supply device 24 supplies the alkaline aqueous solution C from the reservoir tank 23 to the separation liquid L3 via a pipe P200.

Further, the recovery reaction tank 21 may have the detection unit 41 and the control unit 42.

The detection unit 41 detects the concentration of $Mg^{2+}$ contained in the separation liquid L3. As the detection unit 41, for example, a known device can be used. The detection unit 41 may be provided, for example, in a bypass P31 provided in a pipe P4.

The control unit 42 sets the operating conditions of the supply device 24 and controls the amount of the alkaline aqueous solution C to be added to the separation liquid L3 on the basis of the detection result of the detection unit 41. Specifically, the control unit 42 sets the alkaline aqueous solution C in which the amount of $OH^-$ is less than the equal amount to the amount of the measured $Mg^{2+}$ in the separation liquid L3 detected by the detection unit 41 and sets the operating conditions of the supply device 24 such that the set amount of the alkaline aqueous solution C is added to the separation liquid 12. As a result, it possible to accurately control the addition amount of the alkaline aqueous solution C with respect to the separation liquid L3.

Here, in the recovery reaction tank 21, $Mg(OH)_2$ is crystallized using the alkaline aqueous solution C having a known concentration. Therefore, in the recovery reaction tank 21, it is easy to control the amount of the alkaline aqueous solution C in which the amount of $OH^-$ is less than the equal amount to the amount of the measured $Mg^{2+}$ in the separation liquid L3, and it is possible to add the alkaline aqueous solution C to the separation liquid L3 without excess or deficiency.

By controlling the supply amount of the alkaline aqueous solution C in the recovery reaction tank 21 as described above, it is possible to suppress a decrease in the sedimentation rate of the particles of $Mg(OH)_2$ contained in the generated reaction slurry L4.

(Recovery Sedimentation Tank)

The recovery sedimentation tank 22 is connected to the recovery reaction tank 21 via the pipe P4. The reaction slurry L4 generated in the recovery reaction tank 21 is supplied to the recovery sedimentation tank 22 via the pipe P4.

In the recovery sedimentation tank 22, the reaction slurry L4 is reserved to sediment the particles of $Mg(OH)_2$. In the recovery sedimentation tank 22, the reaction slurry L4 is separated into the separation slurry S2 containing the particles of $Mg(OH)_2$ at a high concentration and the waste liquid W containing the particles of $Mg(OH)_2$ at a low concentration.

The separation slurry S2 is extracted from the bottom of the recovery sedimentation tank 22, for example. Separately, the separation slurry S2 is separated into the particles of $Mg(OH)_2$ and water. As a result. $Mg(OH)_2$, which is the target product, is recovered from the separation liquid L3.

(Operational Effects)

In the system for producing magnesium hydroxide 1 having the above configuration, the calcium hydroxide slurry B is added to the water L1 to be treated and the crystallization is caused to generate the reaction slurry L2 containing the particles of $Mg(OH)_2$. Further, the alkaline aqueous solution C is added to the separation liquid L3 separated from the reaction slurry L2 and the crystallization is caused to generate the reaction slurry L4 containing the particles of $Mg(OH)_2$. By crystallizing $Mg(OH)_2$ from the water to be treated L1 in multiple stages in this way, it is easy to react $Mg^{2+}$ with less than the equal amount of $OH-$ to the amount of $Mg^{2+}$, and it is possible to suppress the decrease in the sedimentation rate of the generated $Mg(OH)_2$.

Therefore, according to the system for producing magnesium hydroxide 1 having the above configuration, it is easy to control the addition amount of the hydroxide ions, and it is possible to improve the production efficiency by reacting $OH^-$ and the magnesium ions without excess or deficiency.

In the present embodiment, the detection unit 41 is provided in the bypass P31, but the present invention is not limited to this. As long as the amount of $Mg^{2+}$ contained in the separation liquid L3 can be detected, the detection unit 41 does not have to be configured to measure the concentration in an in-line manner.

Further, in the present embodiment, the control unit 42 controls the operating conditions of the supply device 24, but the present invention is not limited to this. In a case where the fluctuation in the concentration of $Mg^{2+}$ contained in the water to be treated L1 is little and the treatment upstream from the recovery reaction tank 21 is performed under stable conditions, it is conceivable that the concentration of $Mg^{2+}$ contained in the separation liquid L3 is also stable with little fluctuation. In such a case, the operating conditions may be set in a state where the amount of the alkaline aqueous solution C in which the amount of $OH^-$ is less than the equal amount to the amount of the measured $Mg^{2+}$ in the separation liquid L3 is fixed.

Further, in the present embodiment, the decarboxylation unit 60 is provided, but in a case where it is known that the amount of carbonic acid contained in the water to be treated L1 is sufficiently small, the decarboxylation unit 60 may be omitted.

Second Embodiment

Figure 2:
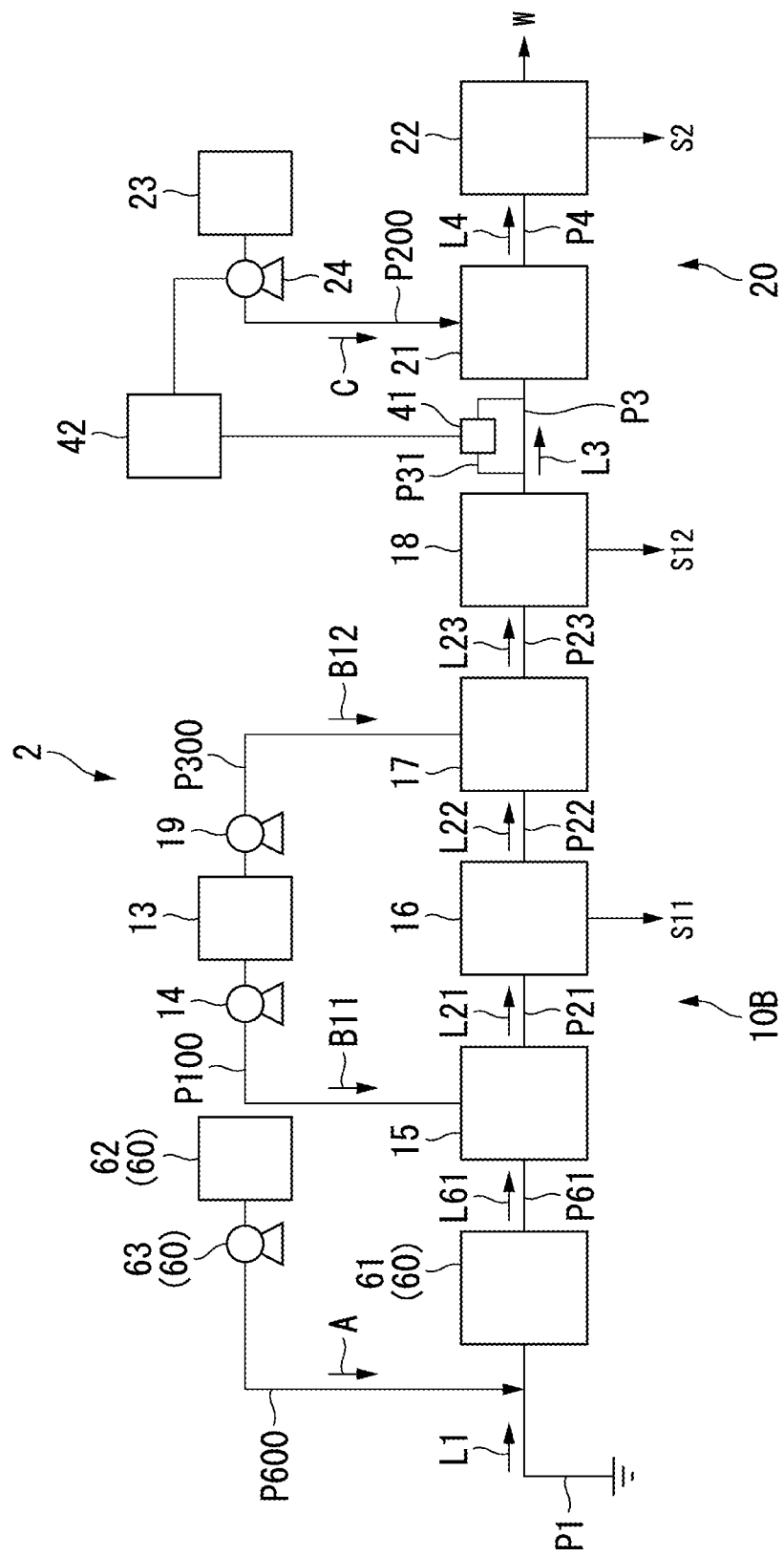
FIG. 2 is an explanatory diagram of a system for producing magnesium hydroxide according to a second embodiment of the present disclosure.

FIG. 2 is an explanatory diagram of a system for producing magnesium hydroxide according to a second embodiment of the present disclosure. The system for producing magnesium hydroxide of the present embodiment is partially common to the system for producing magnesium hydroxide of the first embodiment. Therefore, in the present embodiment, the constituent elements common to the first embodiment are designated by the same reference signs, and detailed description thereof will be omitted.

The system for producing magnesium hydroxide 2 has a first reaction tank 15, a first sedimentation tank 16, a second reaction tank 17, and a second sedimentation tank 18 as a generation unit 10B. That is, the reaction tank of the generation unit 10B includes the first reaction tank 15 and the second reaction tank 17, and the sedimentation tank of the generation unit 10B includes the first sedimentation tank 16 and the second sedimentation tank 18.

(First Reaction Tank)

The first reaction tank 15 has the reservoir tank 13 and the supply device 14. The configuration, function, and operation method of the first reaction tank 15 can be the same as those of the reaction tank 11 of the first embodiment. In the first reaction tank 15, a calcium hydroxide slurry B1 is added to the water to be treated L61 to generate a first reaction slurry L21 containing the particles of $Mg(OH)_2$.

(First Sedimentation Tank)

The first sedimentation tank 16 is connected to the first reaction tank 15 via a pipe P21. The first reaction slurry L21 generated in the first reaction tank 15 is supplied to the first sedimentation tank 16 via the pipe P21.

In the first sedimentation tank 16, the first reaction slurry L21 is reserved to sediment the particles of $Mg(OH)_2$. In the first sedimentation tank 16, the first reaction slurry L21 is separated into a first separation slurry S11 containing the particles of $Mg(OH)_2$ at a high concentration and a first separation liquid L22 containing the particles of $Mg(OH)_2$ at a low concentration.

The first separation slurry S11 is extracted from the bottom of the first sedimentation tank 16, for example. Separately, the first separation slurry S11 is separated into the particles of $Mg(OH)_2$ and water. As a result, $Mg(OH)_2$, which is the target product, can be obtained.

(Second Reaction Tank)

The second reaction tank 17 is connected to the first sedimentation tank 16 via the pipe P21. The first separation liquid L22 generated in the first sedimentation tank 16 is supplied to the second reaction tank 17 via a pipe P22.

The second reaction tank 17 has the reservoir tank 13 and a supply device 19.

In the second reaction tank 17, a calcium hydroxide slurry B2 is added to the first separation liquid L22 to generate a second reaction slurry L23 containing the particles of $Mg(OH)_2$.

The supply device 19 supplies the calcium hydroxide slurry B2 from the reservoir tank 13 to the first separation liquid L22 via a pipe P300.

The amount of the calcium hydroxide slurry B2 supplied by the supply device 24 is set in advance according to the concentration of $Mg^{2+}$ contained in the water to be treated L1. For example, the concentration of $Mg^{2+}$ contained in the water to be treated L1 is separately measured, and the calcium hydroxide slurry B2 in which the amount of $OH^-$ is less than the equal amount to the amount of the measured $Mg^{2+}$ is supplied.

Here, in the first reaction tank 15 and the second reaction tank 17, the total amount of the supply amount of the calcium hydroxide slurry B1 and the supply amount of the calcium hydroxide slurry B2 is set such that the amount of $OH^-$ is less than the equal amount to the amount of the measured $Mg^{2+}$ contained in the water to be treated L1. The total amount of the supply amount of the calcium hydroxide slurry B1 and the supply amount of the calcium hydroxide slurry B2 can be determined in the same manner as the method in which the supply amount of the calcium hydroxide slurry B is set in the reaction tank 11 of the first embodiment.

By adding the calcium hydroxide slurry stepwise to the water to be treated L1, it is possible to obtain $Mg(OH)_2$ having different purities.

For example, when seawater is used as the water to be treated L1, it is conceivable that a heavy metal component is dissolved in the water to be treated L1 in addition to $Mg^{2+}$ and $Ca^{2+}$. An example of the "heavy metal component" includes iron ions. Therefore, it is assumed that the $Mg(OH)_2$ generated in the second reaction tank 17 contains less heavy metal hydroxide than the $Mg(OH)_2$ generated in the first reaction tank 15, and it is conceivable that $Mg(OH)_2$ having a relatively high purity can be obtained.

When the total amount of the supply amount of the calcium hydroxide slurry B1 and the supply amount of the calcium hydroxide slurry B2 is constant, the supply amount of the calcium hydroxide slurry B2 is preferably larger than the supply amount of the calcium hydroxide slurry B1. By increasing the supply amount of the calcium hydroxide slurry B2 to be larger than the supply amount of the calcium hydroxide slurry B1, it is possible to reduce the amount of $Mg(OH)_2$ having a low purity generated in the first reaction tank 15.

By controlling the supply amount of the calcium hydroxide slurry B2 in the second reaction tank 17 as described above, it is possible to suppress a decrease in the sedimentation rate of the particles of $Mg(OH)_2$ contained in the generated reaction slurry L4.

(Second Sedimentation Tank)

The second sedimentation tank 18 is connected to the second reaction tank 17 via a pipe P23. The second reaction slurry L23 generated in the second reaction tank 17 is supplied to the second sedimentation tank 18 via the pipe P23.

In the second sedimentation tank 18, the second reaction slurry L23 is reserved to sediment the particles of $Mg(OH)_2$. In the second sedimentation tank 18, the second reaction slurry L23 is separated into a second separation slurry S12 containing the particles of $Mg(OH)_2$ at a high concentration and a second separation liquid (the separation liquid L3) containing the particles of $Mg(OH)_2$ at a low concentration.

The second separation slurry S12 is extracted from the bottom of the second sedimentation tank 18, for example. Separately, the second separation slurry S12 is separated into the particles of $Mg(OH)_2$ and water. As a result. $Mg(OH)_2$, which is the target product, can be obtained.

(Recovery Unit)

The recovery unit 20 is connected to the second sedimentation tank 18 via the pipe P3. The separation liquid L3 generated in the second sedimentation tank 18 is supplied to the recovery unit 20 via the pipe P3.

The recovery unit 20 can have the same configuration as the recovery unit 20 of the first embodiment. In the recovery unit 20, the alkaline aqueous solution C is added to the second separation liquid obtained in the second sedimentation tank 18 as the separation liquid L3.

(Operational Effects)

In the system for producing magnesium hydroxide 2 having the above configuration, the calcium hydroxide slurry is added to the water L1 to be treated and the crystallization is caused to generate the reaction slurry containing the particles of $Mg(OH)_2$. Further, the alkaline aqueous solution C is added to the separation liquid L3 separated from the reaction slurry L4 and the crystallization is caused to generate the reaction slurry L4. By crystallizing $Mg(OH)_2$ from the water to be treated L1 in multiple stages in this way, it is easy to react $Mg^{2+}$ with less than equal amount of $OH^-$ to the amount of $Mg^{2+}$, and it is possible to suppress the decrease in the sedimentation rate of the generated $Mg(OH)_2$.

Further, in the system for producing magnesium hydroxide 2, the calcium hydroxide slurries B1 and B2 are added stepwise to the water L1 to be treated and the crystallization is caused to generate the reaction slurries L2 and L4. It is conceivable that heavy metal hydroxide contained in the water to be treated L1 is likely to be generated on the upstream side of the system for producing magnesium hydroxide 2. Therefore, in the system for producing magnesium hydroxide 2, by adding the calcium hydroxide slurries B1 and B2 stepwise, it is possible to manufacture $Mg(OH)_2$ having different purities stepwise.

Even in the system for producing magnesium hydroxide 2 having the above configuration, it is easy to control the addition amount of the hydroxide ions, and it is possible to improve the production efficiency by reacting $OH^-$ and the magnesium ions without excess or deficiency.

Although the preferred embodiments of the present disclosure have been described above with reference to the accompanying drawings, the present disclosure is not limited to such examples. The various shapes and combinations and the like of the constituent members shown in the above-mentioned examples are examples and can be variously changed on the basis of design requirements and the like without departing from the gist of the present disclosure.

For example, in the above embodiments, the case where the generation unit has one set of the reaction tank and the sedimentation tank and the case where the generation unit has two sets thereof have been described, but the present invention is not limited to these. The generation unit may further have a third reaction tank and a third sedimentation tank in addition to the configuration of the generation unit 10B of the second embodiment.

APPENDIX

The system for producing magnesium hydroxide described in each embodiment is ascertained as follows, for example.

[1] A system for producing magnesium hydroxide according to a first aspect includes: a generation unit 10A; and a recovery unit 20 connected to the generation unit 10A, wherein the generation unit 10A has a reaction tank 11 in which a calcium hydroxide slurry B2 is added to water to be treated L1 containing magnesium ions to crystallize magnesium hydroxide and to obtain a reaction slurry L2 containing particles of magnesium hydroxide, and a sedimentation tank 12 in which the reaction slurry L2 is reserved to sediment the particles and to separate the reaction slurry L2 into a separation slurry S1 containing the particles at a high concentration and a separation liquid L3 containing the particles at a low concentration, and wherein, in the recovery unit 20, an alkaline aqueous solution C is added to the separation liquid L3 to crystallize magnesium hydroxide and to obtain the reaction slurry L4 and then the reaction slurry L4 is reserved to sediment the particles and to recover the sedimented particles.

According to the above aspect, the calcium hydroxide slurry B is added to the water L1 to be treated and the crystallization is caused to generate the reaction slurry L2 containing the particles of $Mg(OH)_2$. Further, the alkaline aqueous solution C is added to the separation liquid L3 separated from the reaction slurry L2 and the crystallization is caused to generate the reaction slurry L4 containing the particles of $Mg(OH)_2$. By crystallizing $Mg(OH)_2$ from the water to be treated L1 in multiple stages in this way, it is easy to react $Mg^{2+}$ with less than equal amount of OH– to the amount of $Mg^{2+}$, and it is possible to suppress the decrease in the sedimentation rate of the generated $Mg(OH)_2$.

Therefore, according to the system for producing magnesium hydroxide 1 having the above configuration, it is easy to control the addition amount of the hydroxide ions, and it is possible to improve the production efficiency by reacting $OH^-$ and the magnesium ions without excess or deficiency.

[2] In the system for producing magnesium hydroxide according to a second aspect, the alkaline aqueous solution is a sodium hydroxide aqueous solution.

According to the above aspect, the magnesium hydroxide generated in the recovery reaction tank 21 can be made higher in purity than the magnesium hydroxide generated in the reaction tank 11.

[3] The reaction tank of the generation unit 10B includes a first reaction tank 15 and a second reaction tank 17, the sedimentation tank includes a first sedimentation tank 16 and a second sedimentation tank 18, in the first reaction tank 15, the calcium hydroxide slurry B1 is added to the water to be treated L1 to generate a first reaction slurry L21 containing the particles of the magnesium hydroxide, in the first sedimentation tank 16, the first reaction slurry L21 is reserved to sediment the particles and to separate the first reaction slurry S21 into a first separation slurry S11 containing the particles at a high concentration and a first separation liquid L22 containing the particles at a low concentration, in the second reaction tank 17, the calcium hydroxide slurry B2 is added to the first separation liquid L22 to generate a second reaction slurry L23 containing the particles, in the second sedimentation tank 18, the second reaction slurry L23 is reserved to sediment the particles and to separate the second reaction slurry L23 into a second separation slurry S12 containing the particles at a high concentration and a second separation liquid containing the particles at a low concentration, and in the recovery unit 20, the alkaline aqueous solution C is added to the second separation liquid as the separation liquid L3.

According to the above aspect, by adding the calcium hydroxide slurry stepwise to the water to be treated L1, it is possible to obtain Mg(OH)$_2$ having different purities.

[4] The system for producing magnesium hydroxide according to a fourth aspect further includes a decarboxylation unit 60 in which at least some of carbonic acid is removed from the water to be treated L1 prior to the generation unit 10A, 10B.

According to the above aspect, carbonate is less likely to be generated in a process, and it is possible to stably operate the system for producing magnesium hydroxide for a long period of time.

[5] The system for producing magnesium hydroxide according to a fifth aspect further includes a control unit 42 that controls an amount of the alkaline aqueous solution to be added to the separation liquid L3 on the basis of a concentration of the magnesium ions contained in the separation liquid L3.

According to the above aspect, it possible to accurately control the addition amount of the alkaline aqueous solution C with respect to the separation liquid L3.

REFERENCE SIGNS LIST 1.2 System for producing magnesium hydroxide
10A, 10B Generation unit
11 Reaction tank
12 Sedimentation tank
15 First reaction tank
16 First sedimentation tank
17 Second reaction tank
18 Second sedimentation tank
20 Recovery unit
21 Recovery reaction tank
22 Recovery sedimentation tank
42 Control unit
60 Decarboxylation unit
B, B1, B2 Calcium hydroxide slurry
C Alkaline aqueous solution
L1, L61 Water to be treated
L2, L4 Reaction slurry
L3 Separation liquid
L21 First reaction slurry
L22 First separation liquid
L23 Second reaction slurry
S1, S2 Separation slurry
S11 First separation slurry
S12 Second separation slurry
W Waste liquid

The invention claimed is:

1. A system for producing magnesium hydroxide comprising:
 a generation unit; and
 a recovery unit connected to the generation unit,
 wherein the generation unit has
 a reaction tank in which a calcium hydroxide slurry is added to water to be treated containing magnesium ions to crystallize magnesium hydroxide and to obtain a reaction slurry containing particles of magnesium hydroxide, and
 a sedimentation tank in which the reaction slurry is reserved to sediment the particles and to separate the reaction slurry into a separation slurry containing the particles at a high concentration and a separation liquid containing the particles at a low concentration, and
 wherein, in the recovery unit, an alkaline aqueous solution is added to the separation liquid to crystallize magnesium hydroxide and to obtain the reaction slurry and then the reaction slurry is reserved to sediment the particles and to recover the sedimented particles.

2. The system for producing magnesium hydroxide according to claim 1, wherein the alkaline aqueous solution is a sodium hydroxide aqueous solution.

3. The system for producing magnesium hydroxide according to claim 1,
 wherein the reaction tank includes a first reaction tank and a second reaction tank,
 wherein the sedimentation tank includes a first sedimentation tank and a second sedimentation tank,
 wherein, in the first reaction tank, the calcium hydroxide slurry is added to the water to be treated to generate a first reaction slurry containing the particles,
 wherein, in the first sedimentation tank, the first reaction slurry is reserved to sediment the particles and to separate the first reaction slurry into a first separation slurry containing the particles at a high concentration and a first separation liquid containing the particles at a low concentration,
 wherein, in the second reaction tank, the calcium hydroxide slurry is added to the first separation liquid to generate a second reaction slurry containing the particles,
 wherein, in the second sedimentation tank, the second reaction slurry is reserved to sediment the particles and to separate the second reaction slurry into a second separation slurry containing the particles at a high concentration and a second separation liquid containing the particles at a low concentration, and
 wherein, in the recovery unit, the alkaline aqueous solution is added to the second separation liquid as the separation liquid.

4. The system for producing magnesium hydroxide according to claim 1, further comprising a decarboxylation unit in which at least some of carbonic acid is removed from the water to be treated prior to the generation unit.

5. The system for producing magnesium hydroxide according to claim 1, further comprising a control unit that controls an amount of the alkaline aqueous solution to be added to the separation liquid on the basis of a concentration of the magnesium ions contained in the separation liquid.

6. The system for producing magnesium hydroxide according to claim 2,
 wherein the reaction tank includes a first reaction tank and a second reaction tank,
 wherein the sedimentation tank includes a first sedimentation tank and a second sedimentation tank,
 wherein, in the first reaction tank, the calcium hydroxide slurry is added to the water to be treated to generate a first reaction slurry containing the particles,
 wherein, in the first sedimentation tank, the first reaction slurry is reserved to sediment the particles and to separate the first reaction slurry into a first separation slurry containing the particles at a high concentration and a first separation liquid containing the particles at a low concentration, wherein, in the second reaction tank, the calcium hydroxide slurry is added to the first separation liquid to generate a second reaction slurry containing the particles, wherein, in the second sedimentation tank, the second reaction slurry is reserved to sediment the particles and to separate the second reaction slurry into a second separation slurry containing the particles at a high concentration and a second separation liquid containing the particles at a low concentration, and wherein, in the recovery unit, the alkaline aqueous solution is added to the second separation liquid as the separation liquid.

7. The system for producing magnesium hydroxide according to claim 2, further comprising a decarboxylation unit in which at least some of carbonic acid is removed from the water to be treated prior to the generation unit.

8. The system for producing magnesium hydroxide according to claim 3, further comprising a decarboxylation unit in which at least some of carbonic acid is removed from the water to be treated prior to the generation unit.

9. The system for producing magnesium hydroxide according to claim 2, further comprising a control unit that controls an amount of the alkaline aqueous solution to be added to the separation liquid on the basis of a concentration of the magnesium ions contained in the separation liquid.

10. The system for producing magnesium hydroxide according to claim 3, further comprising a control unit that controls an amount of the alkaline aqueous solution to be added to the separation liquid on the basis of a concentration of the magnesium ions contained in the separation liquid.

11. The system for producing magnesium hydroxide according to claim 4, further comprising a control unit that controls an amount of the alkaline aqueous solution to be added to the separation liquid on the basis of a concentration of the magnesium ions contained in the separation liquid.

* * * * *